(12) United States Patent
Schnerr et al.

(10) Patent No.: US 8,598,735 B2
(45) Date of Patent: Dec. 3, 2013

(54) CONTROL UNIT FOR CONTROLLING AN ILLUMINATION DEVICE FOR A MOTOR VEHICLE AS WELL AS AN ILLUMINATION DEVICE FOR A MOTOR VEHICLE WITH SUCH A CONTROL UNIT

(75) Inventors: Michael Schnerr, Reutlingen-Sondelfingen (DE); Uwe Bormann, Heidenheim (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 440 days.

(21) Appl. No.: 12/927,469

(22) Filed: Nov. 16, 2010

(65) Prior Publication Data
US 2011/0285291 A1 Nov. 24, 2011

(30) Foreign Application Priority Data

Nov. 17, 2009 (DE) .......................... 10 2009 054 371

(51) Int. Cl.
| | |
|---|---|
| *B60L 3/14* | (2006.01) |
| *B60L 1/00* | (2006.01) |
| *B60L 3/00* | (2006.01) |
| *H02G 3/00* | (2006.01) |
| *H01K 7/00* | (2006.01) |
| *B60Q 1/14* | (2006.01) |
| *G05F 1/00* | (2006.01) |
| *H05B 37/02* | (2006.01) |
| *H05B 39/04* | (2006.01) |
| *H05B 41/36* | (2006.01) |

(52) U.S. Cl.
USPC ............ 307/10.8; 307/9.1; 307/10.1; 315/76; 315/77; 315/391; 315/294; 315/297

(58) Field of Classification Search
None
See application file for complete search history.

(56) References Cited

U.S. PATENT DOCUMENTS

| 8,258,702 B2 * | 9/2012 | Zielinski et al. ................. 315/77 |
| 2005/0063194 A1 * | 3/2005 | Lys et al. ........................ 362/545 |
| 2009/0021955 A1 * | 1/2009 | Kuang et al. ................... 362/479 |

FOREIGN PATENT DOCUMENTS

| DE | 103 11 396 A1 | 9/2004 |
| EP | 1 555 857 A1 | 7/2005 |

OTHER PUBLICATIONS

Dec. 6, 2011 European Search Report for EP 10 01 3834.6-1239.

* cited by examiner

*Primary Examiner* — Jared Fureman
*Assistant Examiner* — Aqeel Bukhari
(74) *Attorney, Agent, or Firm* — Howard & Howard Attorneys PLLC

(57) ABSTRACT

A controller controls an illumination device of a motor vehicle including at least one light source. The controller includes at least one first stage that provides electric energy for supplying power to the illumination device. At least one second stage forwards the electric energy to the light source. The first stage includes intelligence for controlling the illuminating device, a first supplier for supplying the illumination device with control signals, a generator for generating a constant intermediate voltage, and a second supplier for supplying the second stage with the intermediate voltage. The second stage includes a converter for conversion of the intermediate voltage into a supply voltage suitable for supplying the power to the light source, a third supplier for supplying the light source with the supply voltage, and a mechanism for controlling the light source in dependency on the control signals. Also, an illumination device for a motor vehicle includes the controller.

17 Claims, 3 Drawing Sheets

CONTROL UNIT FOR CONTROLLING AN ILLUMINATION DEVICE FOR A MOTOR VEHICLE AS WELL AS AN ILLUMINATION DEVICE FOR A MOTOR VEHICLE WITH SUCH A CONTROL UNIT

CROSS-REFERENCE TO RELATED APPLICATION

This application claims priority to and benefit of the filing date of German Patent Application 10 2009 054 371.6 entitled "Control Unit for Controlling an Illumination Device for a Motor Vehicle as Well as an Illumination Device for a Motor Vehicle with Such a Control Unit" and filed on Nov. 17, 2009.

BACKGROUND OF INVENTION

1. Field of Invention

The invention relates, generally, to an illumination device of a motor vehicle and, more specifically, to a controller for controlling the device.

2. Description of Related Art

A controller for controlling an illumination device of a motor is known from, for example, DE 10 2006 031 679 A1. In the known controller, the power for supplying the illumination device—in particular, the light sources of the illumination device—are made available by a first stage of the controller, the central light controller. The power made available by the first stage of the controller is provided via the second stage of the controller, the so-called "assembly on the headlight directly to the light sources." That means that the first stage of the controller already has to provide the supply voltage for the illumination device or light sources of the illumination device. In case the type or number of light sources of the illumination device to be provided with power changes, the hardware of the first stage of the controller—in particular, the converter device contained therein for provision of the supply voltage—must be completely re-developed and constructed so that the supply voltage provided by the first stage is adapted to the new requirements in the type and/or number of modified light sources. Thus, it is not possible to employ the known controller—in particular, the first stage of the known controller—for different illumination devices with light sources changed in type and/or number.

Thus, there is a need in the related art for a controller—in particular, the first stage of the controller—that can be used in unchanged form for illumination devices differing from one another, in particular, in type and/or number of light sources.

SUMMARY OF INVENTION

The invention overcomes the disadvantages in the related art in a controller for controlling an illumination device of a motor vehicle. The illumination device includes at least one light source. The controller includes at least one first stage that provides electric energy for supplying power to the illumination device. At least one second stage forwards the electric energy to the light source. The first stage includes intelligence for controlling the illuminating device, control signals supplied to the illumination device, a generator for generating a constant intermediate voltage, and a second supplier for supplying the second stage with the intermediate voltage. The second stage includes a converter for conversion of the intermediate voltage into a supply voltage suitable for supplying the power to the light source, a third supplier for supplying the light source with the supply voltage, and a mechanism for controlling the light source in dependency on the control signals. The first stage is connected via at least one first communications connection to a controller of the motor vehicle. At least one second communications connection between the first stage and second stage supplies the illumination device with the control signals. The second communications connection is adapted to gather, prepare, and convey diagnostic information to the first stage via the second communications connection. The invention overcomes the disadvantages in the related art also in an illumination device for a motor vehicle that includes the controller.

One advantage of the controller for controlling an illumination device of a motor vehicle of the invention is that it—in particular, the first stage of the controller—can be used in unchanged form for illumination devices differing from one another, in particular, in type and/or number of light sources.

Another advantage of the controller for controlling an illumination device of a motor vehicle of the invention is that, at least in the hardware, one and the same first stage of the controller can be resorted to for controlling different illumination devices that differ from one another, in particular, in type and/or number of light sources. Thus, it is not necessary to re-develop and construct the first stage of the controller from the hardware to control different illumination devices. Instead, the first stage of the controller can be constructed as a standard component that can be constructed independently from the illumination device to be controlled and supplied with power at least in the hardware. If a re-programming of the first stage of the controller for controlling and supplying power to another illumination device should be necessary, it can be done without great expenditure rapidly and cost-effectively Another advantage of the controller for controlling an illumination device of a motor vehicle of the invention is that light modules thereof together generate an especially well-dimmed light distribution with a great horizontal dispersion and high brightness values directly beneath a light-dark border on a traffic lane.

Another advantage of the controller for controlling an illumination device of a motor vehicle of the invention is that heat generated by the first stage during operation of the controller can be better emitted to the environment.

Another advantage of the controller for controlling an illumination device of a motor vehicle of the invention is that the second stage can be especially simply configured.

Another advantage of the controller for controlling an illumination device of a motor vehicle of the invention is that, with little effort, a plurality of second stages can be controlled. In addition, scaling is especially easy since additional second stages for controlling additional respective light sources can be provided without problems.

Another advantage of the controller for controlling an illumination device of a motor vehicle of the invention is that more stages can be controlled than the second stage provided in a single module.

Another advantage of the controller for controlling an illumination device of a motor vehicle of the invention is that, by cascading of two standard controller modules, total power provided by the first stage can be doubled.

Another advantage of the controller for controlling an illumination device of a motor vehicle of the invention is that it is possible for the first time to integrate all "LED" light functions in one standard "controller" concept.

Another advantage of the controller for controlling an illumination device of a motor vehicle of the invention is that it reduces development costs and time and component and system costs.

Another advantage of the controller for controlling an illumination device of a motor vehicle of the invention is that there is only one single variant for the first stage such that the first stage needs to be developed, constructed, and tested only once.

Other objects, features, and advantages of the invention will be readily appreciated as the same becomes better understood while reading the subsequent description taken in conjunction with the accompanying drawings.

BRIEF DESCRIPTION OF EACH FIGURE OF DRAWING OF INVENTION

DETAILED DESCRIPTION OF EMBODIMENTS OF INVENTION

Figure 1:
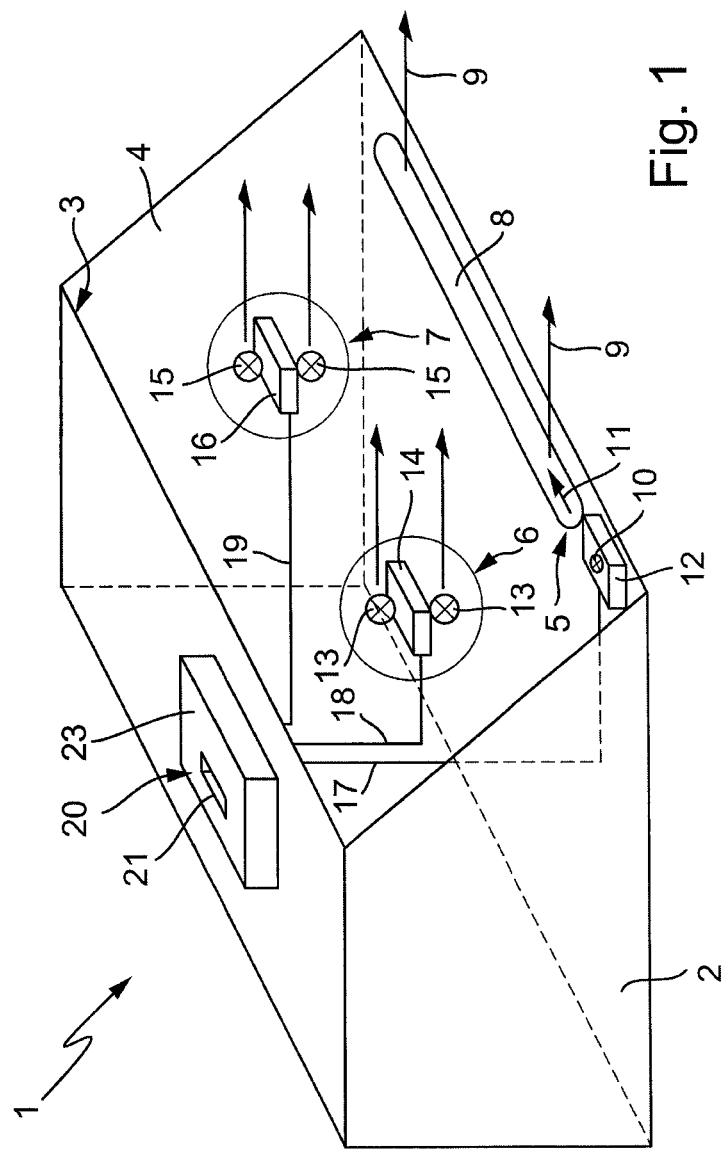
FIG. 1 is a perspective view of an embodiment of a controller for controlling an illumination device of a motor vehicle of the invention and the illumination device.

In FIG. 1, an exemplary embodiment of an illumination device for a motor vehicle according to the invention is generally indicated at 1 in its entirety. The illumination device 1 is constructed as a motor-vehicle headlight. Of course, the invention can also be realized in combination with the taillights or side lamps or any other lights of a motor vehicle. It is even conceivable to realize the invention by means of the interior lights of a motor vehicle.

The illumination device 1 includes a housing 2 that, in one embodiment, consists of plastic. The housing 2 includes a light-emission opening 3 that is sealed by a translucent sealing plug 4, which, in one embodiment, is manufactured of a transparent plastic. The sealing plug 4 can also be constructed as a clear disk without an optically active profile. However, it is also conceivable that the disk 4 exhibits, at least in certain places, an optically active profile, for example, in the form of prisms.

Several light modules 5, 6, 7 are arranged in the interior of the housing 2. The light modules 5, 6, 7 are adapted to generate a desired light distribution. It is conceivable that each of the light modules 5, 6, 7 on its own generates its own light distribution deviating from the light distributions generated by the other light modules. However, it is also conceivable that several light modules 5, 6, 7 work together for the generation of a desired light distribution (for example, by one of the light modules generating a first light distribution with a light-dark border and a great horizontal dispersion) and an additional light module generates a relatively strongly concentrated light distribution (a so-called "spot") that superimposes the first light distribution (for example, beneath the light-dark border in the region of a transition from a horizontal section of the light-dark border to an obliquely ascending section of the light-dark border). Both light modules together thus generate an especially well-dimmed-light distribution with a great horizontal dispersion and advantageous high-brightness values directly beneath the light-dark border on the traffic lane.

In the embodiment of FIG. 1, the first light module 5 generates a parking or navigation light and/or a daytime-running light. In addition, it would be conceivable that the light module 5 is adapted to generate a flashing light. The light module 5 includes a light guide 8, which extends transversely to a direction of light exit 9 in the interior and on the underside of the headlight housing 2, in the front region close to the sealing plug 4. In addition, the light module 5 includes at least one light source 10, wherein at least a portion of the light emitted from the light source 10 is coupled in the light guide in the direction of an arrow 11 via a light-input surface. In one embodiment, the light module 5 also has a device or system at its disposal for bundling the light emitted from the light source 10 (not shown in the figure)—for example, in the form of a reflector or an auxiliary optical system. An auxiliary optical system consists of a transparent glass or plastic material and is constructed in such a way that light coupled in the auxiliary optical system via a light-input surface is bundled by total-internal reflection before the light exits the auxiliary optical system again via a light-output surface of the auxiliary optical system. By bundling the light emitted from the light source 10, a greater portion of the light can be coupled in the light guide 8, a result of which is the efficiency of the light module 5 being increased. The light 11 coupled in the light guide 8 is conducted along the light guide 8 by total-internal reflection. Distributed over the length of the light guide 8, decoupling elements (not shown in the figure) are provided each of which couples out a portion of the coupled-in light 11 from the light guide 8 via a light-output surface in the direction of light exit 9.

The light source 10 includes, in one embodiment, semiconductor light sources—in particular, light-emitting diodes (LEDs). A second stage 12 of an exemplary embodiment of a controller according to the invention is assigned to the light source 10. In the embodiment, the second stage 12 of the controller is even arranged on a common circuit board with the semiconductor light source 10. (This is explained more closely below with the help of FIG. 3.)

By additional light module 6 of the illumination device 1, for example, a passing-light distribution can be produced. Of course, another different primary or secondary light distribution could be generated by module 6—for example, a fog-, a high-beam-, or even an adaptive-light distribution. In the case of the adaptive-light distribution, the light distribution varies in dependency on a state of the motor vehicle (for example, speed, steering angle, position, blinker activation, etc.) and/or environmental parameters of the motor vehicle (for example, weather, traffic-lane conditions, opposing or road traffic in front, density of traffic, etc.).

For generation of the provided light distribution, light module 6 includes at least one reflection module and/or projection module. In the case of a reflection module, the light emitted by at least one light source is reflected by a primary optical system—for example, in the form of a reflector for generating the desired light distribution on the traffic lane in front of the motor vehicle. In the case of a projection module, the light emitted by the light source is, after the bundling by a primary or secondary optical system (for example, in the form of a projection lens), projected onto the traffic lane in front of the motor vehicle to generate the desired light distribution. Light module 6 includes at least one light source 13—in the embodiment, two light sources 13. The light sources 13 can be constructed as light bulbs, gas-discharge lamps, or semiconductor light sources—in particular, LEDs.

An additional second stage 14 of the controller is assigned to the light sources 13. In the embodiment, the light sources 13 are arranged on the same circuit board as the second stage 14. (This is explained more closely below with the help of FIG. 3.) In particular, one of the light sources 13 is arranged on the upper side of the second stage 14, and the other light source is arranged on the underside of the second stage 14 of the controller. In case the light sources 13 are constructed as LEDs, it would even be conceivable that the second stage 14 of the controller is arranged on a common circuit board with the light sources 13. A cooling body can be assigned to the circuit board of the second stage 14 of the controller, or the circuit board can even be constructed as an integral component of a cooling body.

It is conceivable that the two light sources 13 are each assigned to a reflection or projection module. It is also conceivable that one of the light sources 13 is assigned to a reflection module and the light source 13 is assigned to a projection module. (The details of the light modules—in particular, the primary and secondary optical system as well as any existing screen arrangement—are not shown in FIG. 1.) It is conceivable that each of the light sources 13 with the light-module type assigned to it ("reflection" or "projection" module) generates its own light distribution deviating from the other light source 13 and light distribution. The different light distributions generated by the light sources 13 and light-module types assigned to them can each correspond to a desired light distribution—for example, passing light, high-beam light, fog light, etc.). As an alternative, however, it is also possible that the desired total light distribution of light module 6 is generated by a superimposition of the individual partial light distributions generated by the light sources 13 and light-module type assigned to them.

Light module 7 of the illumination device 1 can be constructed similarly to light module 6. The designs made with regard to light module 6 apply in similar fashion also for light module 7. Light module 7 can generate a light distribution deviating from the light distribution generated by light module 6. Taken for itself, this can form a desired light distribution—for example, passing light, high-beam light, fog light, etc. However, as an alternative, it is also possible that the light distribution generated by light module 7 is a partial light distribution that, together with the partial light distribution of light module 6, forms the desired light distribution by superimposition of the two partial light distributions. In accordance with an embodiment of the invention, light module 6 generates a passing- or high-beam-light distribution, and light module 7 generates a high-beam- or passing-light distribution so that each light module 6, 7 generates a desired light distribution (passing- or high-beam-light distribution) for itself. Light module 7 exhibits at least one light source 15—in the example, two light sources 15—that are, in one embodiment, constructed as light bulbs or LEDs. The light sources 15 are assigned to an additional second stage 16 of the controller.

The second stages 12, 14 of the controller of the illumination device 1 are connected to at least one first stage 20 of the controller via communications connections 17, 18, 19. The communications connections 17, 18, 19 are adapted to convey control signals from the first stage 20 of the controller to the second stages 12, 14, 16. The communications connections 17, 18, 19 include, for example, non-high current-control signal lines and/or a bus system that is constructed for transmitting signals or information in accordance with a specified communications protocol. The bus system can be a simple single-wire bus or multiple-wire bus. The data transfer via the bus system between the first stage 20 and second stages 12, 14, 16 of the controller does not necessarily have to take place according to a standardized protocol (for example, "LIN," "CAN," etc.), but rather can also take place according to a proprietary bus protocol, which was developed especially for information transfer in the described case.

In addition, there is also a power-supply-line structure between the first stage 20 and second stages 12, 14, 16 of the controller. (The power-supply-line structure is not indicated in FIG. 1 for better surveyability.) Via the power-supply-line structure, the second stages 12, 14, 16 are supplied with a predefined constant intermediate voltage by the first stage 20. In the second stages 12, 14, 16, suitable converter elements are provided that convert the intermediate voltage received from the first stage 20 to the suitable supply voltage depending on number, type, and/or circuitry of the light sources 10, 13, 15 to be provided with power.

The first stage 20 of the controller can be arranged in its own housing 23 separate from the housing 2 of the illumination device 1 on the exterior of the headlight housing 2 or in another place outside of the illumination device 1. Of course, it is also conceivable that the first stage 20 of the controller is arranged in the interior of the headlight housing 2 such that a separate housing 23 for the first stage 20 can be dispensed with. The arrangement of the first stage 20 outside of the headlight housing 2 has the advantage that heat generated by the first stage 20 during its operation can be better emitted to the environment. This can be improved further as a result of the fact that the housing 23 for the first stage 20 is made of metal—e.g., aluminum die cast—or another especially good thermal-conductive material. The housing 23 for the first stage 20 of the controller does not have to be constructed completely sealed outward. It is conceivable that the underside of the housing 23 for the first stage 20 is formed by the housing 2 of the illumination device 1. In this case, the housing 23 for the first stage 20 would have to be sealed as well as possible from the second housing 2 from moisture or dirt particles, for example, by a sealing lip. Beneath the first stage 20 of the controller, an opening in the headlight housing 2 is provided through which the communications connections 17, 18, 19 as well as the power-supply-line structure to the second stages 12, 14, 16 of the controller are conducted to the interior of the headlight 1.

The first stage 20 of the controller has a plug element 21 that, in the embodiment of FIG. 1, is inset in the housing 23 of the first stage 20. Via the plug element 21, the first stage 20 and second stages 12, 14, 16 of the controller and, in the end, light sources 10, 13, 15 of the illumination device 1 are provided with power and commands for control. Thus, it is, for example, conceivable that, via the plug element 21, a voltage of the motor-vehicle battery—for example, 12V, 24V or even 48V—is supplied to the first stage 20 of the controller. In addition, it is conceivable that commands for controlling the light sources 10, 13, 15, are supplied, for example, in the form of a light-switch or direction-indicator signal. The conveying of the commands for controlling the light sources 10, 13, 15 can take place via non-high current-control signal lines or a bus system that is constructed for the transmission of signals and information in accordance with a specified communications protocol.

Figure 2:
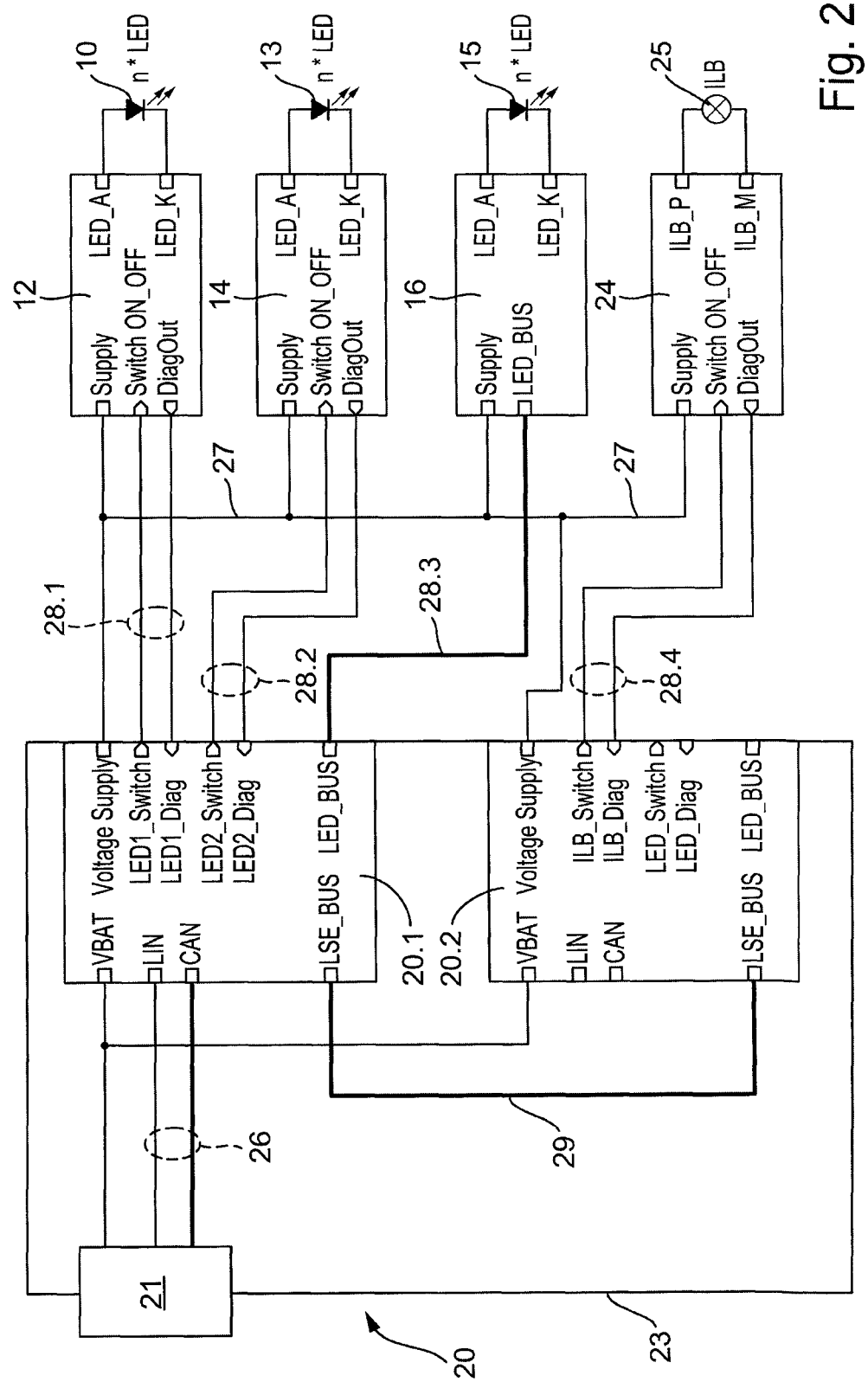
FIG. 2 is a schematic view of the embodiment of the controller for controlling an illumination device of a motor vehicle of the invention shown in FIG. 1.

FIG. 2 shows an exemplary embodiment of the controller. The controller includes at least one first stage 20 as well as at least one second stage 12, 14, 16, 24. In the embodiment, the first stage 20 is in duplicate—that is, a first first stage 20.1 and a second first stage 20.2 are provided. In addition, the controller has a total of four second stages 12, 14, 16, 24. In the process, the second stages 12, 14, 16 are adapted to control at least one LED 10, 13, whereas the second stage 24 of the controller is adapted to control and supply power to another constructed light source—for example, a conventional light bulb [illumination bulb (ILB)]. Of course, the second stage 24 could also be constructed for controlling and supplying power to at least one LED or any other light source.

One aspect of the invention consists in the fact that the first stages 20.1, 20.2 of the controller are each constructed as a standard module, which can be used flexibly for differently designed illumination devices 1 that, in particular, differ from one another with regard to the type, number, and/or circuitry of their respective light sources 10, 13, 15. Each of the first stages 20.1, 20.2 has standard inputs that include at least a first communications connection 26 to a superordinate controller of the motor vehicle—for example, a so-called "body controller." The first communications connection can include non-high current-control signal lines or, as in the embodiment, at least one bus system (such as "LIN" and/or "CAN"). Of course, any other bus system can also be used—for example, a "FlexRay" bus system.

In addition, each of the first stages 20.1, 20.2 of the controller has standard outputs. The standard outputs include a "Voltage Supply" connection at which a constant intermediate voltage "U_Z" generated from the battery voltage "VBAT" is supplied. This intermediate voltage "U_Z" is made available via a power-supply-line structure 27 of the second stages 12, 14, 16, 24 of the controller. In addition, the standard outputs of the first stages 20.1, 20.2 include at least one second communications connection 28 for supplying the second stages 12, 14, 16, 24 with the control signals generated in the first stages 20.1, 20.2 for the light sources 10, 13, 15, 25. The communications connection 28 includes, for example, non-high current-control signal lines 28.1, 28.2, 28.4 or a bus system 28.3 that is constructed for the transmission of signals according to a specified communications protocol. In the embodiment, separate control-signal lines 28.1, 28.2 are provided in the first stage 20.1 for the control of different second stages 12, 14. The third second stage 16 of the controller is controlled via the bus system 28.3. Overall, the first stage 20.1 of the controller can thus control three different second stages 12, 14, 16. Of course, it is conceivable to provide more control-signal lines to be able to control more than the two second stages 12, 14 via control-signal lines 28.1, 28.2. It is likewise conceivable to provide several bus systems or control more than the one second stage 16 via the bus system 28.3. The bus system 28.3 and communications protocol can be configured such that, except for the second stage 16, a great number of additional second stages of the controller can be controlled via the bus system 28.3.

The non-high current-control signal lines 28.1, 28.2, 28.4 have the advantage vis-à-vis the bus system 28.3 that the second stages 12, 14, 24 can be especially simply configured. In particular, they do not require a communications controller with a microprocessor for the processing (controlling and coordinating) of the communication and data transmission via a bus system in the second stages 12, 14, 16. The configuration of the second communications connection 28 as a bus system 28.3 has the advantage that, with little effort, a plurality of second stages can be controlled. In addition, the system can be scaled especially easily since additional second stages for controlling additional respective light sources can be provided without problems. They only have to have a suitable communication controller and be connected to the bus system 28.3. It is not necessary to provide additional control lines for this.

The control-signal lines between the first stage 20.1 and second stage 12 include, for example, a first line that is connected between an output "LED1_Switch" and input " " SwitchON_OFF" for the conveying of control signals to the second stage 12 for the light source 10. The corresponding control-signal line between the first stage 20.1 and second stage 14 of the controller runs between an output "LED2_Switch" and input "SwitchON_OFF." In addition, the control-signal lines 28.1, 28.2 include at least one diagnostic line that runs between an output "DiagOut" of the second stages 12, 14 and inputs "LED1_Diag" and "LED2_Diag" of the first stage 20.1. The line for the bi-directional bus system 28.3 runs between connections "LED_BUS" of the first stage 20.1 and second stage 16.

The second first stage 20.2 likewise includes a second communications connection 28.4 via which the control signals for supplying the light source 25 to the second stage 24 are conveyed. To this end, the second communications connection 28.4 includes a control-signal line that runs between an output "ILB_Switch" on the first stage 20.2 and input "SwitchON_OFF" on the second stage 24. In addition, the second communications connection 28.4 includes a diagnostic line for the transmission of diagnostic information of the light source 25 from the second stage 24 to the first stage 20.2. The diagnostic line runs between an output "DiagOut" of the second stage 24 and input "ILB_Diag" of the first stage 20.2. At the connections "LED_Switch" and "LED_Diag" in the case of the first stage 20.2 in the embodiment, there is no second communications connection to an additional second stage of the controller. There is also no bus system provided as a second communications connection to a further second stage at the connection "LED_BUS" of the first stage 20.2. These connections are not occupied in the embodiment.

The two first stages 20.1, 20.2 both are in contact at the battery voltage "VBAT." In addition, the two first stages 20.2, 20.2 are connected to one another via a third communications connection 29 for the exchange of information. It is conceivable that the third communications connection 29 includes non-high current-control signal lines. The third communications connection 29 includes in the embodiment a bus system that is designed for the transmission of signals and information in accordance with a specified communications protocol. In the process, the signal transmission (as is common in most bus systems) can take place in both directions—thus, bi-directionally. The communications protocol for the transmission of information and data via the bus system 29 can be a standard communications protocol—for example, "LIN," "CAN," or "FlexRay." Of course, it is also conceivable that the communications protocol is a proprietary protocol that is geared toward use for data exchange between the first two stages 20.1, 20.2. If, in a specified embodiment, more than two first stages 20.1, 20.2 are provided, they can all exchange information with one another via the third communications connection 29.

The configuration of the first stage 20 of the controller with two parallel-operating standard controller modules 20.1, 20.2 has several advantages. For one thing, as a result, more stages can be controlled than the second stages 12, 14, 16 provided in a single module 20.1. Controlling the second stage 24 would not be possible without the use of a second first stage 20.2 since the first stage 20.1 no longer has any channels free via which a second stage 24 could be controlled without a bus connection. By the cascading of the two standard controller modules 20.1, 20.2, in addition, the total power of the system provided by the first stage 20 can be doubled. For example, if an output of 60 W is required for the generation of a special light function (for example, a passing-light function by means of LEDs), it can be jointly provided by the two standard controller modules 20.1, 20.2, which each can supply an output of 30 W. Each of the standard controller modules 20.1, 20.2 provides a relatively low output, e.g., 30 W. If in the one or other application a higher output—e.g., 60 W or 120 W—is required, several of the standard controller modules 20.1, 20.2 are simply placed in cascading arrangement.

As already explained above, the second stage 12, 14, 16 of the controller has at least one light source 10, 13, 15 assigned to it in the form of an LED. Each of the second stages 12, 14, 16 is configured in such a way that it provides suitable supply voltage "U_V," depending on the number and/or type of the light sources 10, 13, 15. To this end, suitable converter elements must be provided in the second stage 12, 14, 16, wherein the converter elements convert the intermediate voltage "U_Z" provided by the first stage 20.1, 20.2 into the desired supply voltage "U_V" for the special application. For this reason, the second stages 12, 14, 16 of the controller must be adapted to the planned application—in particular, to the type, number, and/or circuitry of the light sources 10, 13, 15.

The intelligence for generating the control signals for the light sources 10, 13, 15 is contained in the first stage 20.1 of the controller. The control signals are conveyed via the second communications connection 28 to the second stages 12, 14, 16 of the controller and, from there, are forwarded to the light sources 10, 13, 15. Thus, a command "Turn Signal On" reaches the first stage 20.1 of the controller via the plug element 21 and first communications connection 26. From there, a suitable control signal for the flashing-light module—for example, the first light module 5—is generated.

This control signal can then consist of a square-wave signal oscillating between 0 V (turn signal "off") and 5 V (turn signal "on"). This control signal is conveyed to the second stage 12 via the communications connection 28.1. There, the control signal is then, for example, applied to the connection "LED_A," wherein the other connection "LED_K" is grounded. For the duration of the application of the control signal, this leads to a switching "on" and "off" of the light diode 10 in the cycle predetermined by the control signal and, with this, the generation of a flashing-light function by the light module 5.

In accordance with another example, a command "Passing Light On" reaches the first stage 20.1 of the controller via the plug element 21 and first communications connection 26. This command is conveyed via the third communications connection 29 to the additional first stage 20.2. Of course, it would be conceivable to connect another first stage 20.2 of the controller directly to the first communications connection 26. In this case, the bus system 29 of the third communications connection could be omitted. However, in case an information exchange of whatever type between the first stage 20.1 and other first stage 20.2 of the controller is desired, a third communications connection 29 between the two first stages 20.1, 20.2 must be present. A suitable control signal will then be generated for the light bulb 25 from the command arriving at the other first stage 20.2, wherein the light bulb generates, together with the light module assigned to it (including, e.g., primary optical system, secondary optical system, screen, etc.) the passing light. For example, a suitable current or voltage value for the light source 25 can be generated from the command "Passing Light On," which leads to the activation of the light source 25 and generation of the desired passing-light distribution. The control signal generated in the first stage 20.2 is conveyed via a control signal line of the second communications connection 28.4 to the second stage and, from there, is forwarded to the gas-discharge lamp 25.

Figure 3:
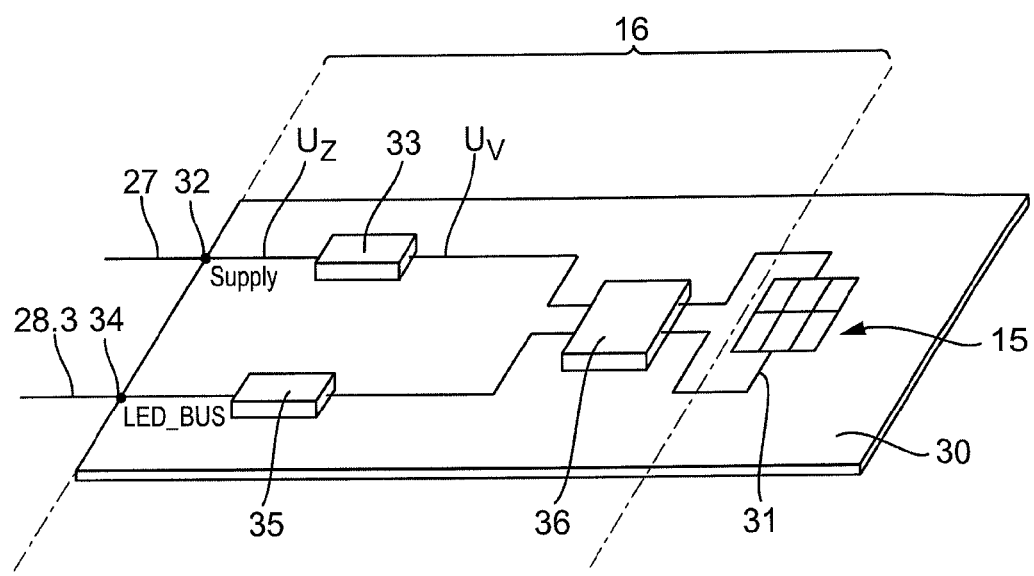
FIG. 3 is a perspective view of a second stage of the embodiment of the controller for controlling an illumination device of a motor vehicle of the invention shown in FIG. 1.

FIG. 3 shows an exemplary embodiment of a second stage 16 of the controller. First, the light sources 15 include, in total, six matrix-like-arranged LEDs. The LEDs are arranged on a circuit board 30 and contacted via lines 31. The circuit board 30 with the LEDs 15 can be handled individually and is also referred to as an "LED chip." For better thermal conduction of the LEDs 15, the circuit board 30 can be formed either entirely or partially of an especially good thermally conductive material—for example, circuit board with metal core. As an alternative, the circuit board 30 can also be thermally coupled with a cooling body or even be an integral component of a cooling body.

In addition to the LEDs 15 and lines 31, in accordance with the invention, electric components can also be arranged and interconnected on the circuit board 30 for realization of the second stage 16 of the controller. The individual components and their respective circuitry are shown only schematically in FIG. 3. They include, for one thing, a connection 32 ("Supply") for the power-supply-line structure 27 via which the intermediate voltage "U_Z" provided by the first stage 20.1 of the controller is supplied to the second stage 16. This intermediate voltage "U_Z" is converted by suitable converter elements 33 of the second stage 16 to the supply voltage "U_V" for the LEDs 15. In the process, the size of the supply voltage "U_V" depends on the type, number, and/or circuitry of the LEDs 15. The converter elements 33 are thus geared to the special application in such a way that a suitable supply voltage "U_V" is generated from the standard constant intermediate voltage "U_Z." In addition, the second stage 16 can include current-regulator elements to keep the supply current of the LEDs 15 at a constant value.

In addition, a connection 34 ("LED_BUS") for the bus system of the second communications connection 28.3 is constructed on the circuit board 30. The signals and messages applied on the bus 283 are received and processed in a communications controller 35 of the second stage 16. The processing includes, for example, a re-conversion (a decoding) of received messages, an extraction of user data from the received messages, and the determination of whether the received user data are provided precisely for this second stage 16 or possibly for a different second stage 12, 14 or 24. The supply voltage "U_V" as well as the decoded control commands can be supplied to a further processing unit 26 in which then the voltage or current signals for the LEDs 15 are determined and then applied to the LEDs. The communications controller 35 and processing unit 36 can also be constructed in a joint element. As a result of this, it would be possible that the processing unit 36 could use the microprocessor of the communications controller 35 so that an additional microprocessor for the processing unit 36 can be dispensed with.

With the invention, it is possible for the first time to integrate all "LED" light functions in one "standard controller" concept. This includes at least one standardized first stage as well as at least one second stage. As a result of this and with regard to the electronics, for the first time, a modular structure of an illumination device is possible in accordance with a "module" principle. What has been attempted for years in the field of mechanics is now possible for the first time in the field of electronics—that is, in the case of the power supply as well as control of the illumination device. The invention offers considerable advantages through reduced development costs and time. The device of the first stage 20 remains unchanged regardless of the type, number, and/or circuitry of the light sources 10, 13, 15, 25 to be controlled (at least with regard to the hardware). The LED modules of the second stages 12, 14, 16, 24 can be easily adapted to the new configurations since the first stage 20 supplies a constant power supply independently from the on-board power supply. The invention has, in addition, considerable advantages with regard to the component costs. As described above, by a cascading of the first stage 20.1, 20.3, a higher output can be provided without the necessity of a hardware change. Also, the LED modules of the second stages 12, 14, 16, 24 have a lower hardware expenditure since, through the first stage 20.1, 20.2, a decoupling from the on-board power supply already exists. Hence, in the case of the second stage 12, 14, 16, 24, reverse-polarity protection on the circuit board 30 as well as measures for improvement of the electromagnetic compatibility can be dispensed with. This applies both for measures for avoiding disturbances evoked by the on-board power supply, which can affect the controller, as well as avoiding disturbances of the on-board power supply, which could be evoked by the second stage 12, 14, 16, 24 of the controller. In particular, the use of filters or similar electrical components can be dispensed with.

Finally, the invention also offers considerable advantages in the case of system costs. With the conventional controllers, all the channels of the controller must be designed for the maximum possible output. In the case of the "two stage" concept, the first stage is only designed for the maximum output of the entire system. This can be more closely explained by an example: In the case of known controllers, for example, two converters with 15 W each are required for daytime running and flashing light. The retrieved output in the real system, however, amounts to only 7 watts in each case. In the case of the controller and "two stage" concept, one converter with 15 W of total power would suffice for supplying both systems (both the daytime running and flashing light). The standard components 20.1, 20.2 of the controller can, for example, be designed for a maximum output of 15 W. If a higher output should be necessary for specified applications, it is possible, as shown in FIG. 2, to have several standard stages 20.1, 20.2 in cascading arrangement. For example, if for a specified application, a total power should be required that corresponds to three or more times the individual output of a first stage 20, three or more first stages 20 can be in cascading arrangement.

By the first stage 20, a decoupling from the motor-vehicle on-board power supply through the provision of a constant intermediate voltage is achieved. The intermediate voltage is, in one embodiment, greater than that of the voltage provided by the motor-vehicle battery. The intermediate voltage can then be transformed down by the second stages 12, 14, 16, 24 to the supply voltage necessary for supplying power to the light sources 10, 13, 15, 25 assigned to the second stages 12, 14, 16, 24. In addition, the first stage 20 offers via the first communication connection 26 the possibility of communication with the world outside of the illumination device. In addition, the first stage 20 is responsible for controlling the LED modules 12, 14, 16, 24 corresponding to their light functions. For example, for a flashing-light function, a synchronized control signal with a cycle of 0.5 s can be provided. Finally, the first stage 20 of the controller is constructed as a separate unit, which, for example, is built on the outside on the illumination device. As a result, the first stage 20 can be easily replaced.

The second stage 12, 14, 16, 24 of the controller, for example, performs the task of current regulation and monitoring of the connected light sources 10, 13, 15, 25. The LED module is, in one embodiment, located directly on the assigned light source 10, 13, 15, 25. The second stage 12, 14, 16, 24 can be flexibly adapted in type, number, and/or circuitry of the LEDs 10, 13, 15, 25—for example, via a "module" principle. Thus, it is conceivable that differently designed second stages 12, 14, 16, 24 are reserved for specified standard applications and used when needed. The second stage 12, 14, 16, 24 can be interchanged with the light source 10, 13, 15, 25 assigned to it.

What is advantageous about the invention is the fact that there is only a single variant for the first stage 20. With this, the first stage 20 needs to be developed, constructed, and tested only once. For the second stage 12, 14, 16, 24, the user has a selection from several standard modules. The second stage 12, 14, 16, 24 is decoupled from the on-board power supply. As a result, a lower expenditure arises in the filtering and reaction to other circumstances of the on-board power supply. In case greater total power is needed, several devices of the first stage 20.1, 20.2 can be interconnected—that is, all "LED" light functions (for example, passing light, high-beam light, fog light, etc.) can be supplied with power from one or more devices of the first stage 20.1, 20.2 (as shown by way of example in FIG. 2). The devices of the second stage 12, 14, 16, 24 can be without intelligence—that is, turning "on"/"off" and clocking of the light sources 10, 13, 15, 25 are achieved via a first signal line. An additional diagnostic line of the second communications connection 28 makes possible a diagnosis of the connected light sources 10, 13, 15, 25 and/or second stages 12, 14, 16, 24. The devices of the second stage 12, 14, 16, 24 can be with a separate microprocessor and control via a bus system 28.3 via which the information for an extended diagnosis, messages about temperature regulation, and a regulation in case desired by the first stage 20 can be conveyed or achieved. The device of the first stage 20 can, in specified embodiments, detect an LED configuration of the illumination device and report back—that is, the software for controlling and supplying power to the light sources 10, 13, 15, 25 running on the microprocessor of the first stage 20 can automatically adapt to the circumstances. Hence, no modification costs arise for the software in using different headlight configurations. The LED modules 12, 14, 16, 24 can, for example, consist of resistor solutions, linear regulators, or (downward) converters. The modules 12, 14, 16, 24 of the second stage can also control light bulbs/halogen lights—that is, different headlight configurations (LED and non-LED) can be realized without variation of the hardware or software. The devices 20 of the first stage can be operated with different equipment variants without influencing the devices 12, 14, 16, 24 of the second stage—for example, for achieving a higher output or different "communication" concept or implementing algorithms for controlling functions. Thus, it is, for example, conceivable that the software running on the microprocessor of the devices 20 of the first stage is "AutoSAR" capable. [AutoSAR (Automotive Open System Architecture) is an international association with the objective of establishing an "open" standard for software architecture in motor vehicles and members of which include various automotive manufacturers and suppliers of electric components.]

In the case of the controller, it is possible to achieve a modified on-board power supply—for example, 24 V or 48 V instead of the usual 12 V simply by replacing the device 20 of the first stage, wherein the devices 12, 14, 16, 24 of the second stage can continue being used unaltered. Along with controlling light functions, electronic consumer products of the most varied type can be integrated into the described system, such as electric-motor drives that are located in headlight range-control units or drives for bending light modules or are adapted to move screens. In deviation from the embodiments, it is also possible that the devices 20 of the first stage as well as the devices 12, 14, 16, 24 of the second stage are arranged in a common housing. That is, for the realization of the invention, only a functional separation of the devices 20 of the first stage and devices 12, 14, 16, 24 of the second stage is necessary. However, their spatial separation is not necessary.

The invention been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A controller for controlling an illumination device of a motor vehicle, the illumination device including at least one light source (10, 13, 15, 25) and said controller comprising:
at least one first stage (20) that provides electric energy for supplying power to the illumination device; and
at least one second stage (12, 14, 16, 24) that forwards said electric energy (20) to the light source (10, 13, 15, 25), wherein said first stage (20) includes intelligence for controlling the illuminating device, control signals supplied to the illumination device, a generator for generating a constant intermediate voltage (U_Z), and a second supplier (27) for supplying said second stage (12, 14, 16, 24) with said intermediate voltage (U_Z), said second stage (12, 14, 16, 24) includes a converter (33) for conversion of said intermediate voltage (U_Z) into a supply voltage (U_V) suitable for supplying said power to the light source (10, 13, 15, 25), a third supplier (31) for supplying the light source (10, 13, 15, 25) with said supply voltage (U_V), and a mechanism for controlling the light source (10, 13, 15, 25) in dependency on said control signals, and said first stage (20) is connected via at least one first communications connection (26) to a controller of the motor vehicle, at least one second communications connection (18, 28.3, 28.4) between said first stage (20) and second stage (12, 14, 16, 24) supplies the illumination device with said control signals, and said second communications connection (18, 28.3, 28.4) is adapted to gather, prepare, and convey diagnostic information to said first stage (20) via said second communications connection (18, 28.3, 28.4).

2. A controller as set forth in claim 1, wherein said first stage (20) is arranged in a housing (23) located outside of a housing (2) of the illumination device.

3. A controller as set forth in claim 1, wherein said second stage (12, 14, 16, 24) is arranged in a housing (2) of the illumination device.

4. A controller as set forth in claim 1, wherein said first communications connection (26) includes current-control signal lines.

5. A controller as set forth in claim 1, wherein said first communications connection (26) includes a bus system (LIN, CAN) for transmission of signals in accordance with a specified communications protocol.

6. A controller as set forth in claim 1, wherein said second communications connection (18, 28.3, 28.4) includes current-control signal lines (28.1, 28.2).

7. A controller as set forth in claim 1, wherein said second communications connection (18, 28.3, 28.4) includes a bus system (28.3) for transmission of signals in accordance with a specified communications protocol.

8. A controller as set forth in claim 1, wherein said at least one first stage (20) includes a plurality of first stages (20.1, 20.2, 20.3) two of which (20.1, 20.2) are connected to one another via at least one third communications connection (29).

9. A controller as set forth in claim 8, wherein said third communications connection (29) includes current-control signal lines.

10. A controller as set forth in claim 8, wherein said third communications connection (29) includes a bus system (Data Bus) for transmission of signals according to a specified communications protocol.

11. A controller as set forth in claim 1, wherein the light source (10, 13, 15, 25) is assigned to said second stage (12, 14, 16, 24) having a suitable power supply (U_V) for supplying power to the assigned light source (10, 13, 15, 25) and controlling the light source (10, 13, 15, 25) in dependency on said control signals of said first stage (20).

12. A controller as set forth in claim 11, wherein said second stage (12, 14, 16, 24) and the assigned light source (10, 13, 15, 25) are a separate component.

13. A controller as set forth in claim 11, wherein said second stage (12, 14, 16, 24) and the assigned semiconductor light source are constructed on a common carrier element.

14. A controller as set forth in claim 13, wherein said second stage (12, 14, 16, 24) and the assigned semiconductor light source are constructed on a common circuit board (30).

15. A controller as set forth in claim 1, wherein the light source (10, 13, 15, 25) includes a semiconductor light source.

16. A controller as set forth in claim 15, wherein the light source (10, 13, 15, 25) includes a light-emitting diode.

17. An illumination device for a motor vehicle, said illumination device comprising:
a housing (2);
at least one light module (5, 6, 7) arranged in said housing (2) and including at least one light source (10, 13, 15) for generating light distribution; and
a controller for supplying power and controlling said illumination device and including:
at least one first stage (20) that provides electric energy for supplying power to said illumination device; and
at least one second stage (12, 14, 16, 24) that forwards said electric energy (20) to said light source (10, 13, 15, 25), wherein said first stage (20) includes intelligence for controlling said illuminating device, control signals supplied to the illumination device, a generator for generating a constant intermediate voltage (U_Z), and a second supplier (27) for supplying said second stage (12, 14, 16, 24) with said intermediate voltage (U_Z), said second stage (12, 14, 16, 24) includes a converter (33) for conversion of said intermediate voltage (U_Z) into a supply voltage (U_V) suitable for supplying said power to said light source (10, 13, 15, 25), a third supplier (31) for supplying said light source (10, 13, 15, 25) with said supply voltage (U_V), and a mechanism for controlling said light source (10, 13, 15, 25) in dependency on said control signals, and said first stage (20) is connected via at least one first communications connection (26) to a controller of the motor vehicle, at least one second communications connection (18, 28.3, 28.4) between said first stage (20) and second stage (12, 14, 16, 24) supplies the illumination device with said control signals, and said second communications connection (18, 28.3, 28.4) is adapted to gather, prepare, and convey diagnostic information to said first stage (20) via said second communications connection (18, 28.3, 28.4).

* * * * *